(12) United States Patent
Struk et al.

(10) Patent No.: US 7,962,684 B2
(45) Date of Patent: Jun. 14, 2011

(54) OVERLAY MANAGEMENT IN A FLASH MEMORY STORAGE DEVICE

(75) Inventors: Vadzim Struk, Minsk (BY); Aleh Dzenisiuk, Dubrovno District (BY); Derrill Sturgeon, Cupertino, CA (US)

(73) Assignee: Sandisk Corporation, Milpitas, CA (US)

( * ) Notice: Subject to any disclaimer, the term of this patent is extended or adjusted under 35 U.S.C. 154(b) by 634 days.

(21) Appl. No.: 12/031,384

(22) Filed: Feb. 14, 2008

(65) Prior Publication Data

US 2009/0210615 A1    Aug. 20, 2009

(51) Int. Cl.
*G06F 12/02* (2006.01)

(52) U.S. Cl. ........................................ 711/103; 711/159

(58) Field of Classification Search ........................ None
See application file for complete search history.

(56) References Cited

U.S. PATENT DOCUMENTS

| | | | |
|---|---|---|---|
| 5,588,129 A | 12/1996 | Ballard | 395/440 |
| 7,062,761 B2 | 6/2006 | Slavin et al. | |
| 7,127,559 B2 | 10/2006 | Hu et al. | |
| 2006/0143388 A1 | 6/2006 | Wintergerst et al. | 711/130 |
| 2006/0190924 A1 | 8/2006 | Bruening et al. | 717/104 |
| 2007/0061597 A1* | 3/2007 | Holtzman et al. | 713/193 |
| 2007/0106853 A1* | 5/2007 | Evanchik et al. | 711/159 |
| 2010/0023673 A1 | 1/2010 | Struk et al. | |

FOREIGN PATENT DOCUMENTS

| | | |
|---|---|---|
| EP | 0403124 A | 12/1990 |
| WO | WO 2010/011780 | 1/2010 |

OTHER PUBLICATIONS

ARC International "MetaWare Development Toolkit—Automated Overlay Management Specification Rev 1.5," 2006 ARC International, 39 pages.*
"Computer Systems Organization II (Virtual Memory)," Google, http://cs.nyu.edu/courses/spring03/V22.0202-001/lectures/lect15.pdf/ downloaded Feb. 12, 2008, 6 pages.
ARC™ International "MetaWare™ Development Toolkit—Automated Overlay Management Specification Rev 1.5," 2006 ARC International, 39 pages.
International Search Report and Written Opinion mailed Sep. 16, 2009 in Application No. PCT/US2009/051445 [P623WO].

* cited by examiner

*Primary Examiner* — Than Nguyen
(74) *Attorney, Agent, or Firm* — Weaver Austin Villeneuve & Sampson LLP

(57) ABSTRACT

The operating firmware of a portable flash memory storage device is stored in the relatively large file storage memory, which is non executable. It is logically parsed into overlays to fit into an executable memory. The overlays can be of differing sizes to organize function calls efficiently while minimizing dead space or unnecessarily separating functions that should be within one or a group of frequently accessed overlays. Eviction of the overlays is preferably carried out on a least recently loaded basis. These features minimize latency caused by calling overlays unnecessarily and minimize fragmentation of the random access memory used for the overlays.

18 Claims, 8 Drawing Sheets

OVERLAY MANAGEMENT IN A FLASH MEMORY STORAGE DEVICE

BACKGROUND OF THE INVENTION

The present application relates to flash memory, and more specifically to management of the firmware of flash memory storage devices.

Flash memory mass storage devices, that is to say, those that are primarily used to store large amounts of user files, often utilize NAND flash memory as a main storage unit, rather than NOR or other execute in place memory. Such storage devices include digital memory cards and USB drives and the like used to store massive libraries of photos and music etc, and are even recently utilized as the primary storage in certain laptop computers. Because of the large amount of storage available in the NAND, it is desirable to use the NAND to store the firmware, even though it is not executable from NAND.

SUMMARY OF THE INVENTION

In a portable flash memory mass storage device, a least recently loaded ("LRL") eviction process is employed because it is proven to be more efficient than a least recently used ("LRU") eviction process. The LRU processing time has been found to exceed storage access time in a constrained environment, i.e. an environment where the storage access time is fast relative to the available CPU resources, as is the case in a portable flash memory mass storage device.

Use of an LRL eviction process avoids having to coalesce fragmented memory resulting from out of order eviction. This is especially beneficial in devices with low CPU bandwidth relative to secondary storage such as NAND flash. Avoidance of fragmentation allows for simplified overlay management code which saves both code space (reduced RAM cost) and algorithm compute time (improved performance).

Another aspect of system is the eviction of overlays in load order in conjunction with the use of variable sized overlays. The LRL eviction allows for variable sized overlays without causing fragmentation. This enables better tuning of working sets and avoids loading irrelevant code or dead space.

DETAILED DESCRIPTION OF THE PREFERRED EMBODIMENTS

Software programs are loaded into an electronic device executable memory and executed. When a software program is larger than the executable memory capacity of the device, then software overlays or virtual memory are used.

Virtual memory is an address space that is mapped to physical memory via an operating system typically employing a memory management unit implemented in hardware. It is common in personal computer and other unconstrained computing devices. In a virtual memory system, large programs are broken up into small segments, called "pages." Pages are loaded from secondary storage, as needed, into a section of machine memory reserved for the program.

In memory cards and other flash memory storage devices virtual memory is not practical and not typically implemented. This lack of virtual memory management is one aspect of a constrained environment. Therefore, software overlays are utilized. The operating software of a flash memory storage device is typically referred to as the firmware. A firmware overlay is a program segment called into memory when required by an overlay manager. Each overlay called may overwrite an existing overlay in memory.

Figure 1A:
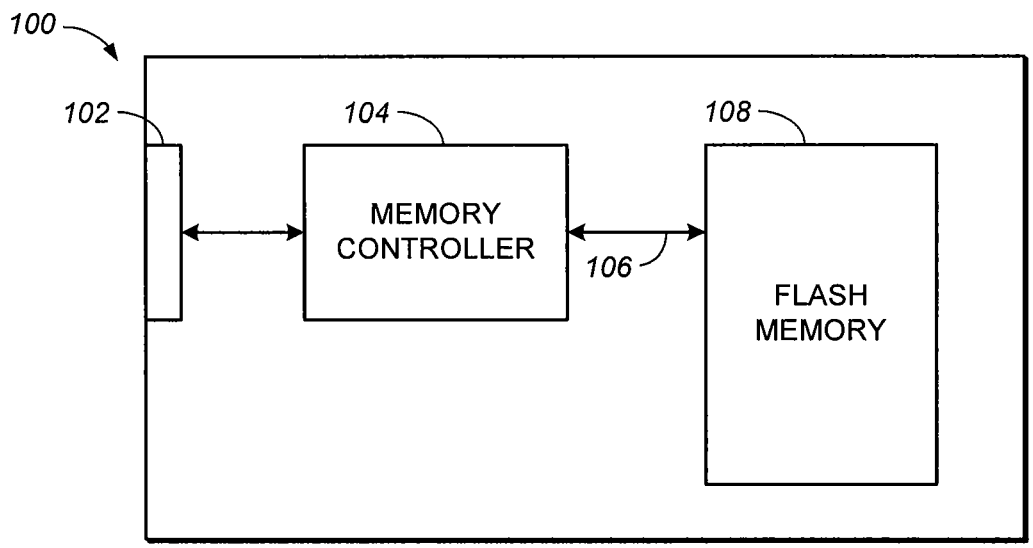
FIG. 1A is a block diagram illustrating flash memory storage device 100.

FIG. 1A illustrates flash memory storage device ("FMSD") 100. FMSD comprises a flash memory array 108, memory controller 104, and host interface 102. Flash memory array 108 is a non-execute in place variety of flash memory, preferably of a NAND architecture and is typically in the form of a EEPROM. Flash memory array 108 is used to store mass quantities of user files and is the main data storage repository of device 100. As such, it is desirable to take advantage of the large capacity and to store the firmware, or operating instructions for FMSD 100 with array 1089. Memory controller 104 itself comprises a processor and an executable random access memory ("RAM") (not shown). FMSD 100 may also comprise one or more RAM memories outside of the memory controller. Host interface 102 may be configured to be the contacts of a memory card such as a Secure Digital or other memory card standard, may be a universal serial bus ("USB") connector or IEEE 1394 "firewire" connector or the like, or in the case FMSD 100 is embedded, may be a device specific interface. Flash memory array 108 is coupled to memory controller 104 via control and data lines 106.

The firmware that runs a memory storage device is broken up into overlays appropriately sized to fit into a RAM to be executed. Countless hours are spent determining what function calls should optimally go into the various overlays, so that the tasks of firmware are efficiently executed, with minimum of latency resulting from cycling overlays into and out of RAM unnecessarily. For example, if a function in a first overlay calls for another function in a second overlay and vice versa, then the system would spend much time "thrashing" between the two overlays. While this example with two overlays is overlay simplistic, the point is that if the overlay management is not properly managed, much time can be spent simply switching between overlays rather than performing the overall functions of the firmware.

In large processor controlled systems such as personal computers, where typically the processing speed is significantly faster than the storage access time of the hard drive or other data storage mechanism, and large amounts of RAM are available, this is much less of a problem. The relatively large amount of available RAM, together with virtual memory management techniques available in PC's and the like are not characteristic of constrained system environments.

Constrained system environments that incorporate NAND memory are especially problematic because the firmware is quite large and complex and in order to manage the storage operations of the NAND architecture. NAND memory often has regions that vary in quality from other regions within or between multiple memory die. In order to save costs, systems such as memory cards employ unproven NAND with such variable quality regions. This is in contrast to systems that may employ only tested good NAND, meaning that poorer performance regions are either not utilized or otherwise not present. Such a luxury is not available or practical in larger capacity devices that must be provided at minimal costs. In such devices, the firmware must actively manage the usage of the NAND to constantly monitor the performance of the various regions and modify the read/write parameters and physical/logical mapping of the data, so that unreliable areas are mapped out if necessary and the user files and data will not be compromised or lost. This results in even larger and more complicated firmware (than with tested good NAND), which means that overlay management and RAM usage is therefore critical.

A (firmware) function stored in an overlay may be called at any time. There is no guarantee that the overlay containing the function will be in RAM when the function is called. An automatic overlay manager ("AOM") of the firmware must handle each call in order to manage the "fault" cases where a function is called but is not present in RAM.

In the case of a fault, the AOM will load the appropriate overlay prior to locating the function and calling it, which will be discussed in greater detail later.

Figure 1C:
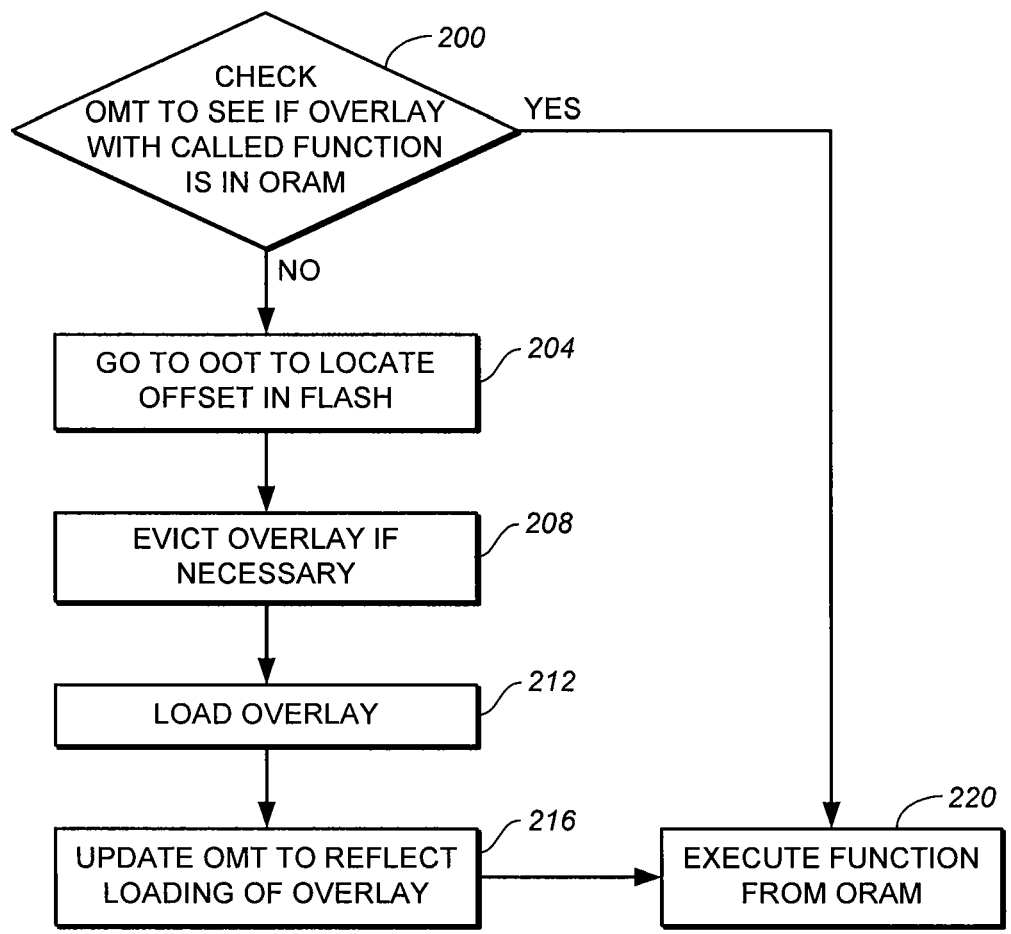
FIG. 1C is a flowchart describing overlay management at a high level.
Figure 1B:
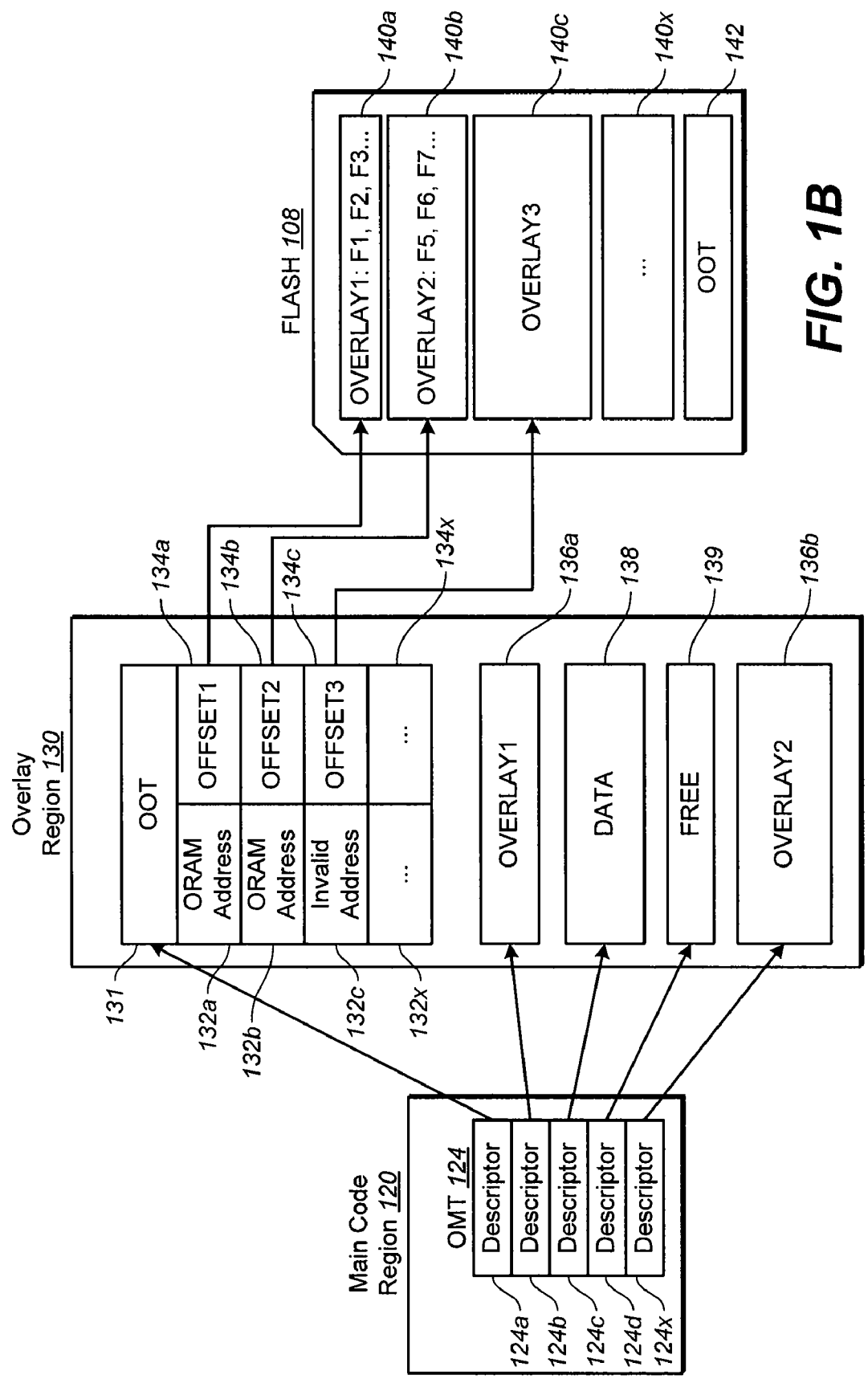
FIG. 1B is a block diagram illustrating a portion of the RAM and flash memory space of FMSD 100.

FIG. 1B illustrates a portion of the RAM and flash memory space of FMSD 100. Main code region 120 of RAM contains an overlay mapping table ("OMT") 124 with descriptors/entries 124a-124x. The OMT is a table that describes the overlays currently loaded in overlay RAM ("ORAM"). Each entry 124a-x of OMT 124 describes a particular area in ORAM 130, also referred to as overlay region 130. The 124 OMT is a map to overlays in RAM and it is constantly changing. It defines how much RAM is allocated to which overlay and what portion(s) of RAM is/are free.

ORAM 130 comprises overlay offset table ("OOT") 131, which in turn comprises ORAM addresses 132a-132x. OOT 131 is a map to overlays in the flash memory. Each ORAM address 132a-x indicates the corresponding offset 134a-134x of the particular overlay within the flash memory. The OOT 131 is a table that describes all overlays 140a-140x located in flash that are candidates to be loaded at some point on demand. The OOT 142 is itself loaded into ORAM together with the overlays. Each of the overlays 136a-x or 140a-x contains at least one function, as represented in overlays 140a and 140b.

As can be seen in FIG. 1B, various overlays 136a-136x (only 136a and 136b shown) are present in the ORAM 130. The number of overlays depends on the size of the individual overlays and the overall ORAM 130. ORAM 130 may be a discrete RAM or a region within a larger RAM allocated to overlays. Data 138, and free space 139 are also present in ORAM 130. Data 138 may be either dynamic or static. Dynamic data is allocated for temporary usage. The most frequent use of dynamic data is a temporary buffer. Static data is a concrete block of variables that is initialized with concrete values. While overlays are loaded on demand, static type data 138 requires both a locked memory region and a load of initial state from flash. Static data may have its own token (ID). The difference between dynamic data and static data is that dynamic data does not require any load from flash but only requires a locked memory region to hold a buffer. With regard to static data the AOM will not write back (to flash) any modifications that happen to the static data while it is in RAM.

The AOM is considered "automatic" because the loading of overlays is handled without having to explicitly specify when and where to load within the primary flow of logic in the FMSD firmware. The determination of when to load them is left to the AOM. This is to say that the AOM functionality can be integrated into any different number of FDSM products or configurations, and need not be specifically configured to the particular hardware implementation.

For each overlay function, the compiler generates a token reference to an overlay the function belongs to, and an offset of the function in the overlay. For each call of the overlay function, the compiler generates a special set of instructions to call the AOM handler providing the function token in a special register.

Before calling the target function, the AOM ensures that the overlay containing the function is loaded to ORAM. The information about overlay addresses in ORAM is located in the OOT. The index of the overlay in the OOT can be extracted from an overlay token. Each OOT entry contains an overlay ORAM address field. This acts as a short cut and eliminates the need to search the OMT in certain embodiments. If the overlay has not been loaded to ORAM, then the field value equals −1 (invalid address). That means that the overlay should be loaded from flash to ORAM. The AOM does this using another OOT entry field—Offset. Offset indicates the overlay address in flash. Whether the target function was already in ORAM or has been loaded by the AOM, it is safe to call it. The OMT contains information about memory distribution. It comprises the descriptors, and each descriptor includes: start address, size, flags and token (overlay ID). The flags field indicates whether the entry points to free memory or to memory occupied with an overlay or data buffer. For further information, please refer to the *MetaWare™ Development Toolkit—Automated Overlay Management Specification Rev* 1.5 of ARC™ International, available at www.arc.com, which is hereby incorporated by reference in the entirety.

In order to load an overlay, sufficient free space must be available in RAM. In general, space is made available though an eviction process.

Eviction refers to the process of selecting an overlay that is already in RAM and discarding it to make space available for a new overlay to be loaded. How overlays are selected for eviction varies. The conventional approach utilized in prior systems is to follow the LRU policy of eviction, as mentioned earlier. That is to say that in past devices, the LRU overlay was discarded to make way for a new overlay having a function called by the executed firmware.

In contrast, the preferred embodiment of the FDSM 100 and its AOM use a least recently loaded ("LRL") eviction process, which may also be thought of as a type of first-in-first-out algorithm. While overlays are evicted by the LRL rule, data (buffers) 138 are not evicted on an LRL basis, but are loaded at the top of the memory to prevent memory fragmentation.

The least recently used (LRU) method should not be confused with the least recently loaded (LRL) method, which are very different despite the similarity in nomenclature.

There are numerous problems with the conventional LRU eviction algorithm, a few of which are noted below:

Problem 1: LRU adds overhead (latency) to every overlay function call (even if the function does not fault) and it increases AOM RAM consumption due to the need to track LRU indicators per overlay. The LRU indicators must be updated on each call. There are several ways to maintain the LRU indicators. For example, it can be done in the OMT per each overlay that is loaded at the time of the call, or it can be done in the OOT per each overlay that is available to be loaded. The advantage of the OMT method is that less space is dedicated to tracking the LRU indicator because fewer overlays are being actively tracked. The advantage to the OOT method is that no searching is required to locate the LRU indicator that should be updated. This is because the function token itself references the OOT. But with either strategy, there are extra instructions and extra RAM utilized to implement an LRU eviction algorithm.

Problem 2: In embodiments where overlays are allowed to vary in size, a strict LRU algorithm will tend to cause RAM fragmentation very quickly. The result will be that multiple evictions are sometimes needed and then overlays previously loaded often must be moved in order to create a contiguous area large enough to allow the new overlay to be loaded. The need for more than one eviction to be identified and carried out with the necessary table updates and RAM defragmentation adds significantly to the latency of the fault cases. The complexity of this multistage eviction and defragmentation algorithm and defragmentation code dramatically increase the code size of the AOM and increases the latency from handling faults. Experience indicates that these features accounted for more than half of the AOM code size.

Problem 3: One way to mitigate Problem 2 is to restrict overlays to a uniform size. This, however has its own drawbacks. When overlays are of a common size, it eliminates having to do multiple eviction and it eliminates the need to defragment memory, but, if overlays are forced to be a uniform specific size then constraints are placed system wide on functions to conform to the size limit and this significantly reduces the automatic and transparent benefits of the AOM. It also results in additional overlay load events due to forcing overlays which represent a specific working set that happens to exceed the size limit to be broken up in to multiple smaller overlays. And for small functions that are used by several overlays, which would naturally make more sense in a single function minimum sized overlay, it becomes necessary to load a full size overlay with either empty space or irrelevant code. This results in pressure on RAM, more need to evict and more load events, all of which are undesirable.

FIG. 1C is a flowchart describing an embodiment of overlay management at a high level. In step 200 the system checks the OMT to see if an overlay with a called function is in ORAM. If it is, the function will be executed from the ORAM as seen in step 220. If however it is not, in step 204 the system will go to the OOT to locate the overlay in flash, as determined by the overlay offset. In step 208, the system will evict one or more overlays if necessary, to make space for another needed overlay or overlays. This is where the LRL method is applied. In step 212, the overlay is loaded, and in step 216, the OMT is updated to reflect the loading of the overlay. With the function and associated overlay in memory the function will be executed from ORAM in step 220.

Figure 1D:
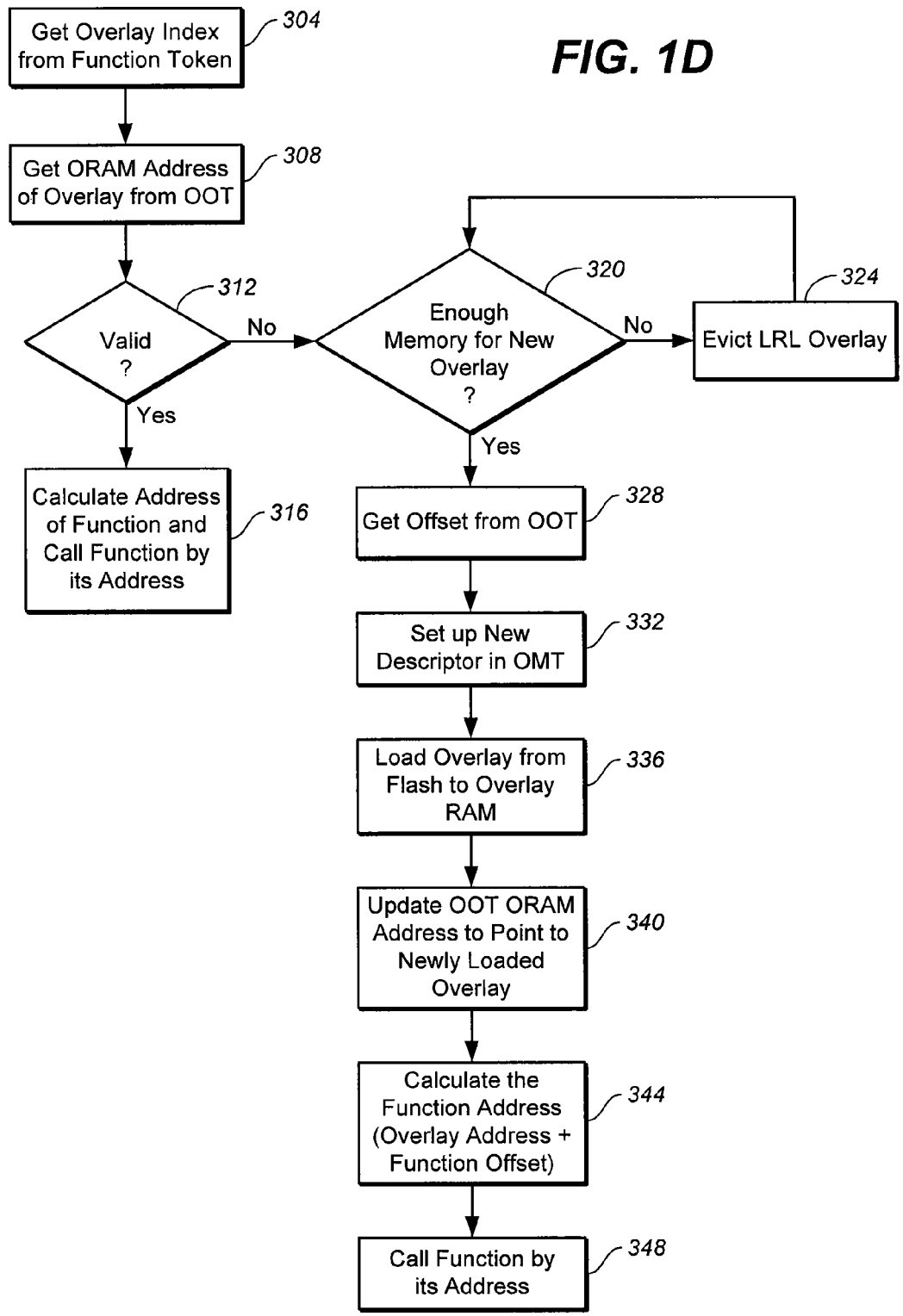
FIG. 1D is a flowchart illustrating overlay management in greater detail.

FIG. 1D is a flowchart illustrating an embodiment of overlay management in greater detail. In step 304 the system gets an overlay index from a function token. As mentioned previously, the index uniquely identifies an overlay in the OOT. This index provided in the function token in certain embodiments eliminates the need to search the OMT. In step 308, the system gets the ORAM address of the overlay from the OOT. In step 312 the system determines if the address is valid, in other words if it is in the ORAM or not. If so, in step 316 the system calculates the address of the function and calls the function by its address.

If however, the address is not valid, as determined in step 312, the system will then check if there is enough memory for a new overlay in step 320. If not, the system will evict a LRL overlay in step 324 and return to step 320. If, however, there is enough memory in step 320, the system will then get the offset from the OOT in step 328. Next, in step 332, the system will set up a new descriptor in the OMT. In step 336, the overlay will be loaded from flash to ORAM, and in step 340, the OOT ORAM address will be updated to point to the newly loaded overlay. In step 344, system will calculate the function address, which is the overlay address plus the function offset. Finally, in step 348, the function will be called by its address.

FIGS. 2-6 illustrate different aspects and scenarios of LRL evictions. Various manipulations of ORAM 130, shown here in a simplified form, and referenced earlier with regard to FIG. 1B will be described for illustrative purposes. Note that the size of the ORAM and number of overlays will typically be higher than that shown in the simplified illustrations of FIGS. 2-7.

Figure 2:
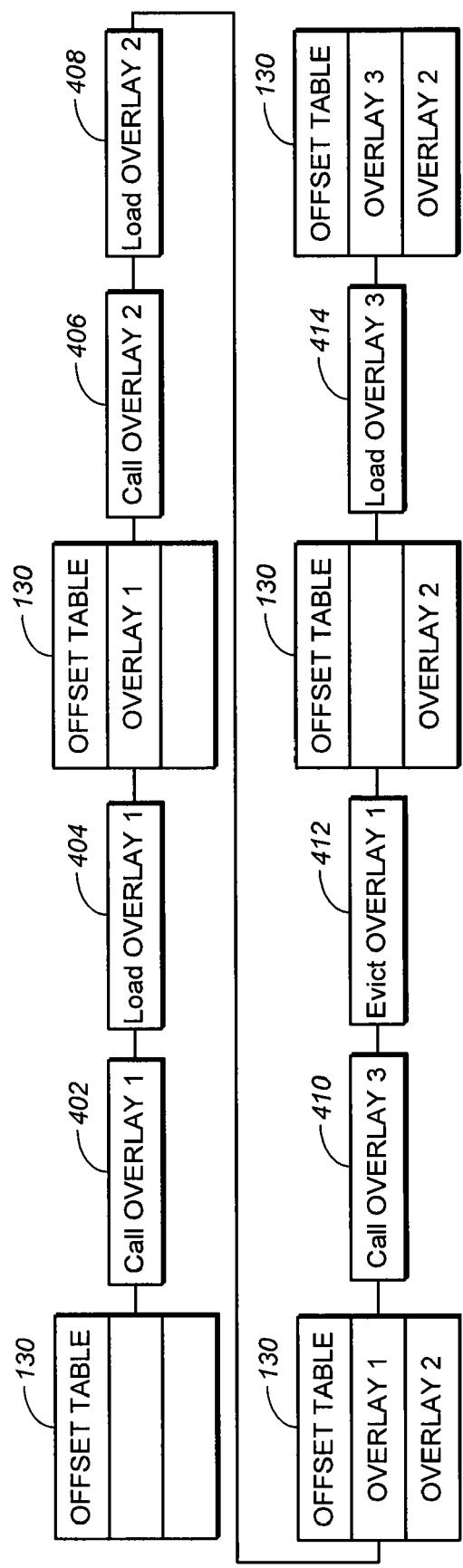
FIGS. 2-6 illustrate different aspects and scenarios of least recently loaded overlay evictions.

FIG. 2 illustrates the eviction of a single least recently loaded overlay. After overlay 1 is called in step 402 it is loaded in step 404, as seen in ORAM 130. After overlay 2 is called in step 406 it is loaded in step 408. After overlay 3 is called in step 410, overlay 1 is then evicted in step 412 and overlay 3 is loaded in step 414.

Figure 3:
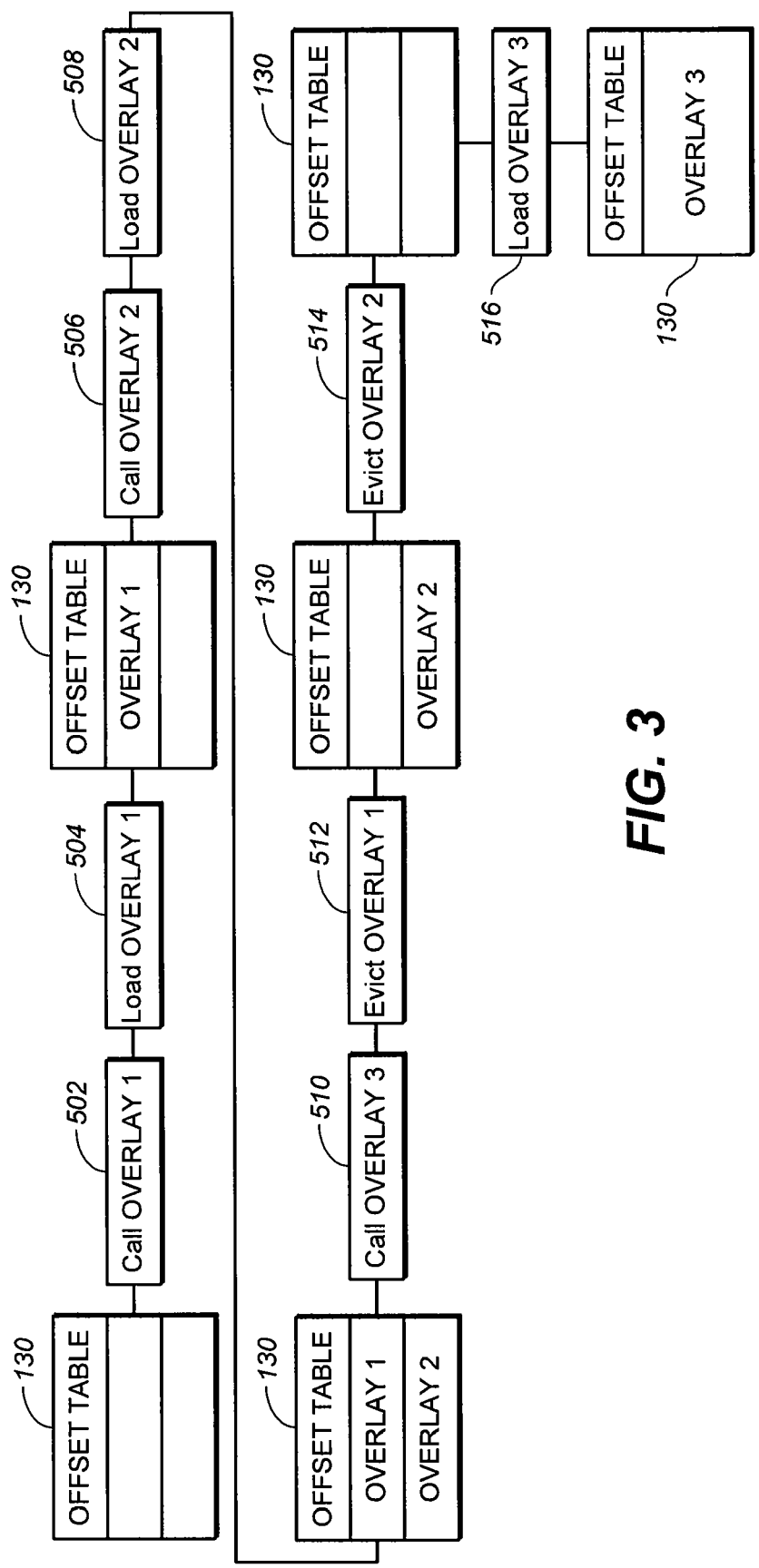

FIG. 3 illustrates the eviction of several least recently loaded overlays to fit a new overlay in memory. After overlay 1 is called in step 502 it is loaded in step 504, as seem in ORAM 130. After overlay 2 is called in step 506 it is loaded in step 508. As the ORAM is then full, when overlay 3, of a size requiring the eviction of two overlays is called in step 510, overlay 1 is then evicted in step 512 and overlay 2 is also evicted in step 514. Overlay three is then loaded in step 516 after the eviction of overlays 1 and 2.

Figure 4:
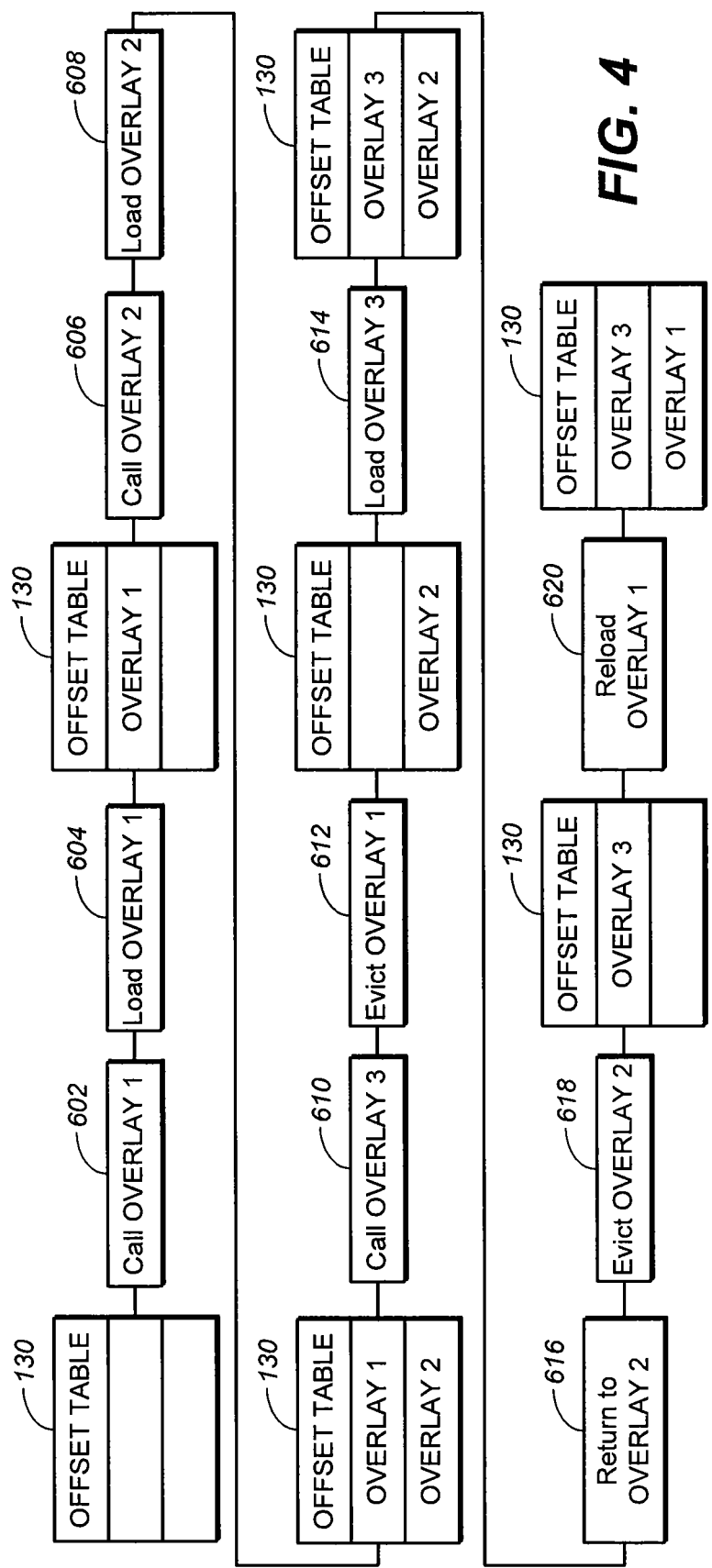
Figure 5:
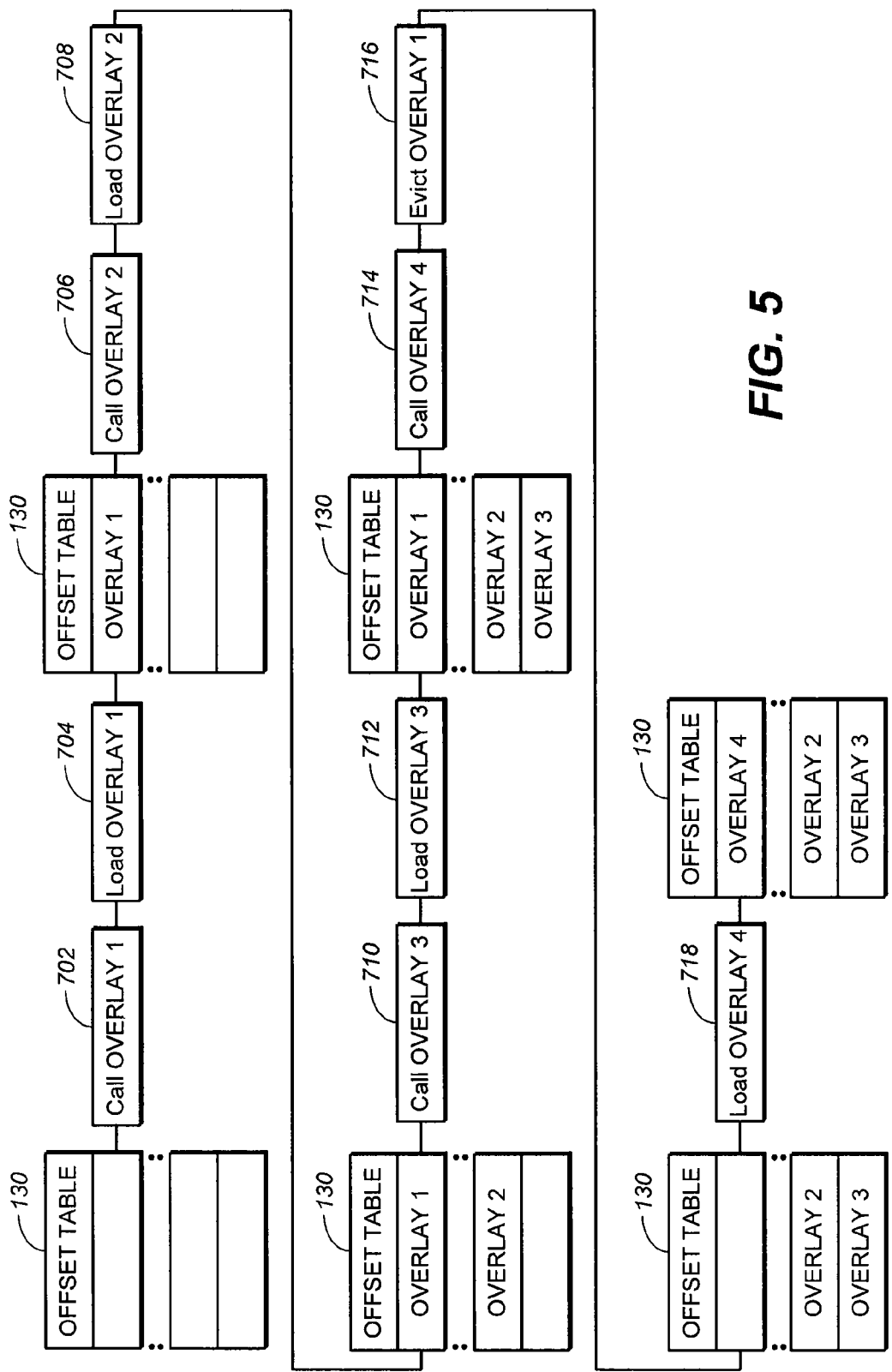

FIG. 4 illustrates call stack fix up upon eviction. After overlay 1 is called in step 602, and loaded in step 604, overlay two is called in step 606 and loaded in step 608. After overlay 3 is called in step 610, overlay 1 is evicted in step 612 and overlay 3 is loaded in step 614. When a function is again needed from overlay 1, as seen in step 616, overlay 2 will then be evicted, as seen in step 618, and overlay 1 will be reloaded in step 620.

FIG. 5 again illustrates eviction of least recently loaded overlays. After overlay 1 is called in step 702, and loaded in step 704, overlay 2 is called in step 706 and loaded in step 708. Then overlay 3 is called in step 710 and loaded in step 712. After overlay 4 is then called in step 714, overlay 1 is evicted in step 716, and overlay 4 is loaded in step 718.

Figure 6:
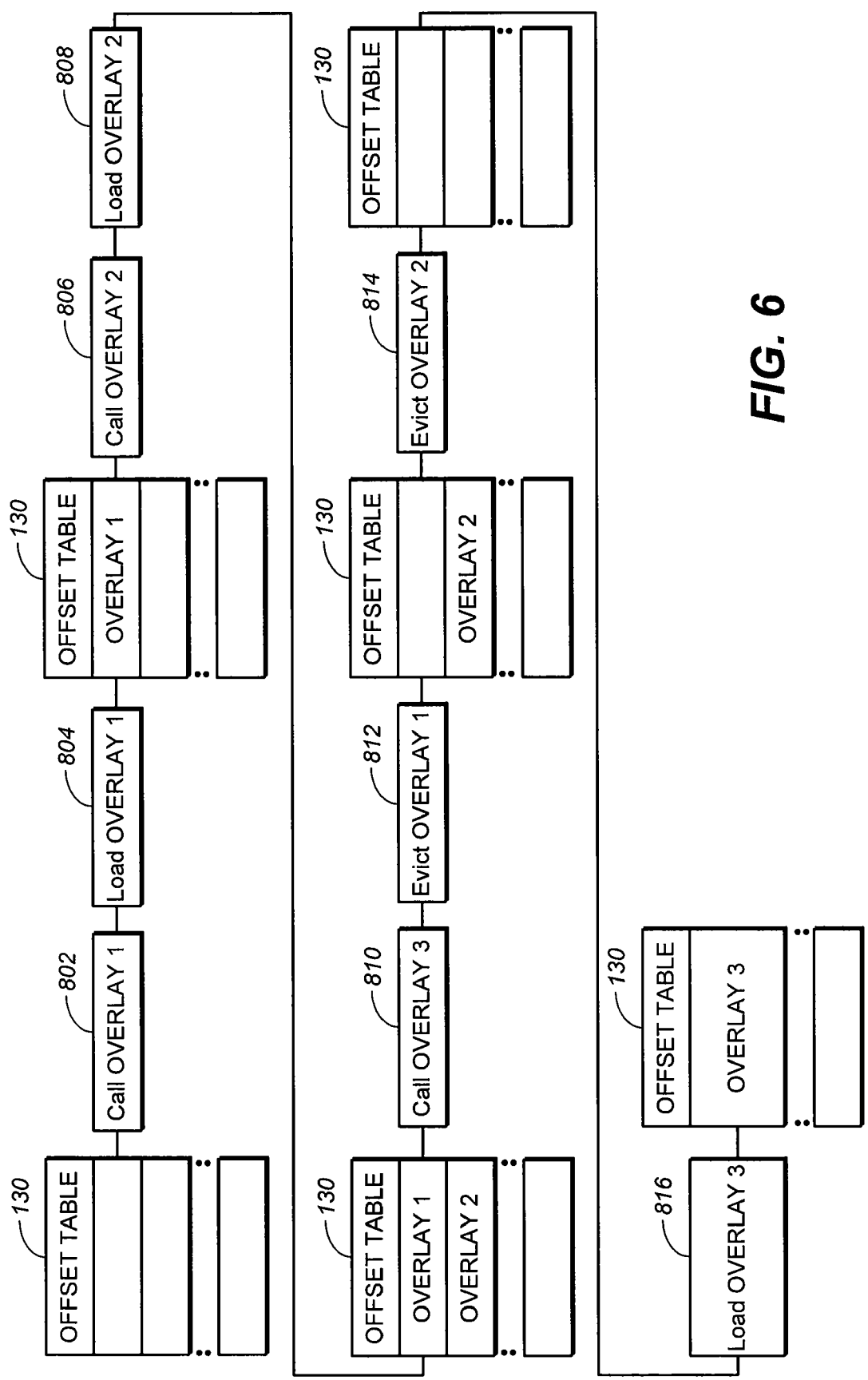

FIG. 6 illustrates the eviction of several least recently loaded overlays to fit a new overlay in memory. After overlay 1 is called in step 802 and loaded in step 804, overlay 2 is called in step 806 and loaded in step 808. After overlay 3 is called in step 810, overlay 1 is then evicted in step 812 and overlay 2 evicted in step 814 to make room for the larger overlay 3, which is then loaded in step 816.

The invention claimed is:

1. A method of operating a memory system incorporating NAND flash memory and a memory controller, the method comprising:

storing firmware to be executed by the memory controller within the NAND flash memory;

logically ordering the firmware into overlays of a size less than a maximum amount of a RAM memory within the memory controller allocated for firmware execution, said overlays varying in size;

loading one or more of the overlays into the RAM memory from the NAND memory;

determining that a current overlay should be loaded from the NAND memory and that one or more least recently loaded overlays in the RAM memory that have been least recently loaded should be evicted, wherein determining the one or more least recently loaded overlays is based on an ordering of overlays in the RAM memory from least to most recently loaded into the RAM memory and the number of the one or more least recently loaded overlays is selected based on a size of the current overlay; and evicting said one or more least recently loaded overlays from the RAM memory.

2. A method for operating a flash memory storage device, the method comprising:
retrieving an overlay index;
retrieving the location of a new firmware overlay within a flash memory of the storage device;
determining if a RAM address of the new overlay is valid; and
if the address is determined to be valid, calling a function of the new overlay, but
if the address is determined to be not valid, analyzing if there is enough memory for the new overlay in a RAM memory allocated to overlay execution, and if not, evicting one or more least recently loaded overlays from the RAM memory allocated to overlay execution, wherein selection of the one or more least recently loaded overlays is based on an ordering of overlays in the RAM memory from least to most recently loaded into the RAM memory.

3. The method of claim 2, further comprising, if it is determined that there is enough memory for the new overlay, getting an address offset within the flash memory of the new overlay from a table in a RAM memory.

4. The method of claim 3, further comprising setting up a new descriptor in an overlay mapping table.

5. The method of claim 4, further comprising loading the new overlay from the NAND flash memory to the RAM memory allocated to overlay execution.

6. The method of claim 5, further comprising updating the overlay RAM address in the overlay offset table to point to the newly loaded overlay.

7. The method of claim 6, further comprising calculating the needed function address.

8. The method of claim 7, wherein the function address comprises the overlay address plus the function offset.

9. The method of claim 7, further comprising calling the needed function by its address.

10. The method of claim 2, wherein the overlay index is retrieved from a function token.

11. The method of claim 2, wherein retrieving the location comprises referencing an overlay RAM address within an overlay offset table stored within[a RAM memory allocated to overlay execution.

12. The method of claim 2, wherein the number of the one or more least recently loaded overlays is selected based on a size of the firmware overlay.

13. A method of operating a flash memory storage device, comprising:
providing firmware, the firmware divided into overlays;
providing a random access memory overlay region;
providing a random access memory main code region;
providing a table of entries within the random access memory main code region, each entry within the table describing an area of the random access memory overlay region;
providing a table within the random access memory overlay region that describes the location of one or more overlays within the flash memory; and
each time space is needed within the random access memory overlay region, evicting one or more overlays that are selected based on an ordering of least recently loaded into the random access memory overlay region from the a NAND flash memory.

14. The method of claim 13, further comprising gathering the flash location of an overlay from the random access memory overlay region and loading the overlay from the flash memory into the random access memory overlay region after the one or more overlays has been evicted.

15. The method of claim 14, further comprising setting up a new descriptor of the newly loaded overlay in the table of entries within the random access memory main code region.

16. The method of claim 15, further comprising updating the address within the random access memory overlay region to point to the newly loaded overlay.

17. The method of claim 16, further comprising calling a function within the newly loaded overlay.

18. A flash memory storage system, comprising:
a NAND flash memory EEPROM;
a memory controller comprising a processor, said processor characterized as having low bandwidth relative to the NAND flash memory EEPROM,
operating instructions for the memory controller, said operating instructions stored within the NAND flash memory and divided into overlays;
random access memory (RAM) within the controller for executing operating instructions with the processor, the overlays varying in size, the random access memory having a size greater than any of the overlays, the system configured to evict one or more least recently loaded overlays based on an ordering of overlays in the RAM from least to most recently loaded into the RAM from the NAND flash memory EEPROM and to load additional overlays from the NAND flash memory to the random access memory, wherein the number of the one or more least recently loaded overlays is selected based on a size of the additional overlays.

* * * * *

UNITED STATES PATENT AND TRADEMARK OFFICE
CERTIFICATE OF CORRECTION

| | | |
|---|---|---|
| PATENT NO. | : 7,962,684 B2 | |
| APPLICATION NO. | : 12/031384 | |
| DATED | : June 14, 2011 | |
| INVENTOR(S) | : Struk et al. | |

It is certified that error appears in the above-identified patent and that said Letters Patent is hereby corrected as shown below:

In line 3 of claim 11 (column 7, line 43) remove "[".

In line 17 of claim 13 (column 8, line 17) remove "the".

Signed and Sealed this
Twenty-sixth Day of July, 2011

David J. Kappos
*Director of the United States Patent and Trademark Office*